United States Patent [19]
Thompson

[11] 3,916,960
[45] Nov. 4, 1975

[54] CATALYST UNLOADER APPARATUS AND METHOD

[75] Inventor: Robert L. Thompson, Alvin, Tex.

[73] Assignee: Browning-Ferris Industries, Inc.

[22] Filed: Apr. 26, 1974

[21] Appl. No.: 464,313

[52] U.S. Cl. .................................. 141/1; 141/65
[51] Int. Cl.² ..................... B65B 3/00; B65B 1/00
[58] Field of Search ........................ 141/65, 1, 7

[56] References Cited
UNITED STATES PATENTS
3,786,130  1/1974  Baker.................................. 141/65

Primary Examiner—Houston S. Bell, Jr.
Attorney, Agent, or Firm—Pravel & Wilson

[57] ABSTRACT

A catalyst unloader apparatus and method for unloading flowable particle catalyst from reactor tubes using the apparatus. The unloader apparatus forms a reference pressure area in a head adjacent an open end of the reactor tubes to provide a pressure differential for flowing the catalyst from the tubes to the head. A higher pressure discharge of a plurality of lances movable through the tubes are used for dislodging and circulating out catalyst lodged within the tubes of the reactor.

11 Claims, 2 Drawing Figures

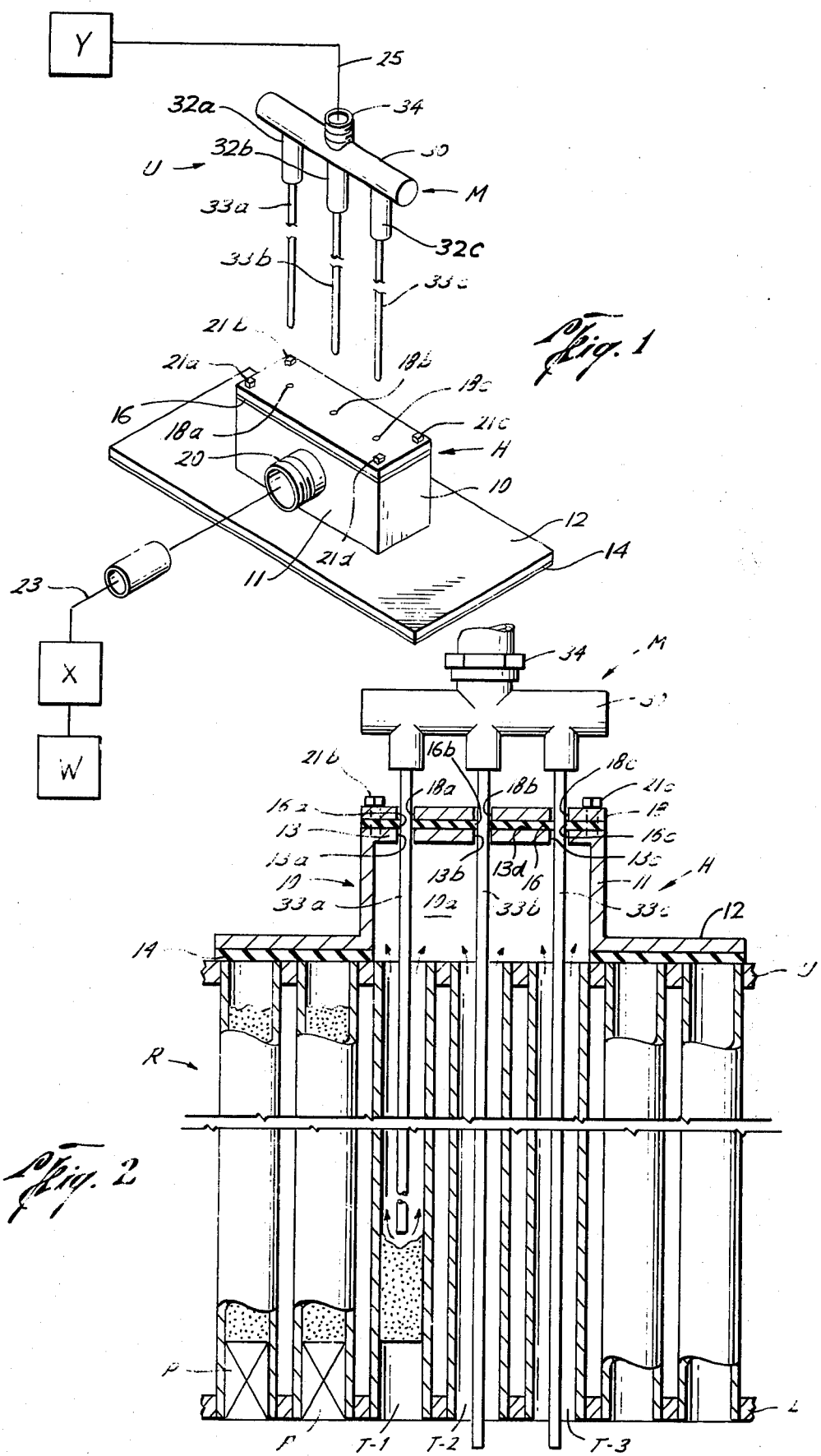

CATALYST UNLOADER APPARATUS AND METHOD

BACKGROUND OF THE INVENTION

This invention relates to the field of unloading devices for removing catalyst from within the tubes of a reactor.

In unloading flowable granular or particle catalyst from the tubes of a multi-tube reactor, difficulties have been encountered in removing catalyst that has become lodged within the tubes during reactor operation. In some previous instances, the particle catalyst completely blocked or bridged some or all of the tubes of the reactor due to heat, composition changes, and the like, and retarded or blocked movement or flow of the catalyst from the tubes of the reactor.

SUMMARY OF THE INVENTION

The present invention relates to the field of a new and improved method and apparatus for unloading catalyst lodged within the tubes of a multi-tube reactor.

The apparatus includes a head positionable adjacent open ends of a plurality of reactor tubes for creating a pressure differential in the reactor tubes for flowing the catalyst from the reactor tubes into a chamber formed by the head. The head mounts a manifold system having a plurality of movable lances discharging a controlled stream of fluid into the tubes for dislodging bridging catalyst in the reactor tubes and circulating the catalyst from the tubes.

BRIEF DESCRIPTION OF THE DRAWINGS

FIG. 1 is a perspective view of the apparatus of the present invention; and,

FIG. 2 is a side view, in section of the apparatus of the present invention operably positioned for unloading catalyst from within a plurality of reactor tubes.

DESCRIPTION OF THE PREFERRED EMBODIMENT

In the drawings, the letter U generally designates the catalyst unloader apparatus of the preferred embodiment of this invention mounted with a reactor R. As illustrated in FIG. 2, the reactor R includes an upper horizontal tube sheet U spaced from a lower horizontal tubesheet L and having a plurality of vertical tubes, designated T-1, T-2, and T-3 extending therebetween which are filled with the catalyst C and which is held within the tubes T-1, T-2, T-3 by porous catalyst retainers P adjacent the lower tubesheet L.

The catalyst unloader U includes a vacuum head H operably positioned adjacent the open end of the reactor tubes of the upper tubesheet U, and a manifold means M mounted with the head H. The vacuum head H includes a bottom open flow chamber forming housing or box 10 having a base or flange plate 12 extending outwardly from the lower periphery of the box 10 and mounting a resiliently deformable base gasket 14 of sufficient thickness for sealing with the upper tubesheet U. As illustrated in FIG. 1, the box 10 and base flange 12 is preferably of a rectangular configuration, but can be of any other suitable shape for forming an open flow chamber 10a sealed to the tubesheet U about the chamber 10a periphery. The box 10 includes upstanding side portions or walls 11 connected by a top panel or cover 13 (FIG. 2) having a plurality of openings 13a, 13b, and 13c formed therethrough. A manifold gasket 16 is mounted above the top surface 13d of the cover 13 and having a plurality of holes 16a, 16b, and 16c formed therethrough in aligned relationship with opens 13a, 13b, and 13c, respectively. Mounted above the manifold gasket 16 is a gasket retainer plate 18 for securing the gasket 16 with the box 10 and having aligned opening 18a, 18b, and 18c formed therethrough. The gasket retainer plate 18 is secured with the box 10 by suitable means such as bolts 21a, 21b, 21c, and 21d. The resiliently deformable manifold gasket 16 is preferably made of a rubber, latex or teflon variety and is of sufficient thickness and resiliency to normal block flow through openings 13a, 13b and 13c.

Affixed to the upstanding side wall 11 of the box 10 is a chamber outlet connector 20 for enabling connection in flow communication through schematic flow conduit 23 with a high volume vacuum producing means, indicated schematically at W, for reducing the fluid pressure in the enclosed chamber 10a formed by the box 10 in the usual manner. A separator means, indicated X, may be connected in the flow conduit 23 at an intermediate location for separating the particle catalyst from the fluid flowing to the vacuum producing means W, as is well known.

The manifold means M includes a hollow central flow body 30 having a plurality of outlet flow couplings 32a, 32b, and 32c and an inlet or supply connector 34 in flow communication by the body 30. A plurality of tubular flow lances 33a, 33b, and 33c are secured with the projecting couplings 32 by suitable means. The supply connector 34 provides means for connecting the body 30 through schematic conduit 25 with a source of fluid under pressure, indicated schematically at Y, which is communicated through the body 30 to the plurality of lances 33a, 33b, and 33c for discharge into the reactor tubes T-1, T-2, and T-3 as will be set forth in greater detail hereinafter. By proper selection of equipment it is possible that the discharge of the vacuum producing means W may under certain conditions also provide the source of fluid under pressure. As illustrated in FIG. 2, the lances 33a, 33b, and 33c are operably disposed in the openings 13a, 13b, and 13c respectively, and are movable relative to the box 10 into the tubes T-1, T-2, and T-3. The gasket 16 deforms to enable movement of the lances 33a, 33b and 33c effecting a fluid tight leakage blocking seal about the lances 33a, 33b, and 33c.

In the use and operation of the present invention, the vacuum head H is positioned to seal with the upper tubesheet U such that the box 10 and gasket 14 enclose the tubes of the portion of the tube sheet U to be cleaned with the openings 18a, 18b and 18c aligned with the reactor tubes to be cleaned. A vacuum is then created in chamber 10a using the vacuum producing means W connected by conduit 23 to the box 10 at the connection 20. The operation of the vacuum producing means W may provide a sufficient pressure differential to initiate sufficient flow of fluid in the reactor tubes toward the box 10 to remove loosely packed particles of catalyst C from the reactor tubes. The vacuum producing means draws catalyst C from the openings of the tubes adjacent the upper tubesheet U and through the vacuum chamber 10a and outwardly from the chamber 10a through the conduit 23 to the separator X. This pressure differential created flow will remove a great bulk of the catalyst C within the tubes. However, in many instances portions of the tubes are bridged by catalyst C wedged or lodged in the tubes and this catalyst C is not dislodged by the high volume vacuum means W. to dislodge these wedged or lodged particles of catalyst C it is necessary to use the manifold means M.

The manifold body 30 is connected to a fluid pressure source Y by conduit 25 through coupling 34 where the flow is directed through the body 30 to the projecting couplings 32. The lances 33a, 33b and 33c are selected of appropriate preselected length and diameter to enable their movement through the reactor tubes for dislodging catalyst as required by discharging the fluid under pressure in close proximity to the bridging catalyst to essentially blast or jet the catalyst loose and provide an annular circulation flow back to the box 10 from a location within the tube spaced from the box 10. With the high positive pressure source actuated, the lances 33a, 33b, and 33c are lowered into the reactor tubes as a unit by manipulating the body 30 with the high positive pressure air from the manifold body 30 directed outwardly from lower end of the lances 33a, 33b, and 33c. Thus, a combination action occurs such that the high positive pressure source works in conjunction with the high volume vacuum source to effectively remove bridging catalyst C in the reactor tubes by blasting or jetting action.

With the positive pressure source being of a relatively low volume as compared to the high volume vacuum source, the high volume vacuum source initiated flow remains relatively unaffected by the introduction of the positive jetting or blasting pressure. After cleaning a desired set of the tubes, the lances 33a, 33b, and 33c are withdrawn from the vacuum head H. The vacuum head H is the repositioned on the tubesheet U to clean catalyst C from a different set of tubes loaded with catalyst C. This procedure is repeated until all tubes of the reactor R are in the cleaned condition.

While the illustrated embodiment is for the simultaneous cleaning of three reactor tubes, it will be understood that the present invention is adopted to clean any desired number of tubes by increasing or decreasing the number of lances employed.

While it is normally contemplated the fluid carrying the particle catalyst from the tubes will be air, the use of other gases or fluids compatible with the catalyst C is clearly within the scope of the present invention.

The foregoing disclosure and description of the invention are illustrative and explanatory thereof, and various changes in the size, shape and materials as well as in the details of the illustrated construction may be made without departing from the spirit of the invention.

I claim:

1. A catalyst unloader apparatus for removing non-packed, non-bridging and packed, bridging flowable catalyst from within a reactor tube, comprising:

a head adapted for positioning adjacent an open end of the catalyst filled reactor tube for effecting unloading of the catalyst;

means associated with said head for effecting a pressure differential in the reactor tube for flowing the non-packed, non-bridging catalyst from the reactor tube to said head;

means with said head for discharging a controlled stream of fluid into the reactor tube for dislodging packed, bridging catalyst lodged in the reactor tube wherein the catalyst is unloaded from the reactor tube by said means effecting a pressure differential.

2. The structure as set forth in claim 1, wherein said means for effecting a pressure differential includes:

means for producing a vacuum adjacent said head for urging the catalyst in the reactor tube to move toward said head.

3. The structure as set forth in claim 1, wherein said means for discharging a controlled stream of fluid into the reactor tube includes:

manifold means for discharging the controlled stream of fluid into the reactor tube at a location spaced from said head and adjacent the packed, bridging catalyst.

4. The structure as set forth in claim 1, wherein:

said head is formed for positioning adjacent an open end of a plurality of catalyst filled reactor tubes secured to a tubesheet for simultaneously effecting unloading of the non-packed, non-bridging catalyst and packed, bridging catalyst from the plurality of reactor tubes.

5. The structure as set forth in claim 4, wherein said means for discharging a controlled stream of fluid into the reactor tube includes:

manifold means mounting a plurality of lances for discharging the controlled stream of fluid into the plurality of reactor tubes at a location spaced from said head and adjacent to the packed, bridging catalyst.

6. The structure as set forth in claim 5, wherein:

each of said plurality of lances is movably mounted with said head and aligned with one of said plurality of reactor tubes for moving through the reactor tube to discharge the controlled stream of fluid in near proximity to the packed, bridging catalyst to dislodge the packed, bridging catalyst.

7. The structure as set forth in claim 6, wherein:

the discharged flow from said plurality of lances flows through the reactor tubes toward said head for flowing the catalyst toward said head.

8. The structure as set forth in claim 7, wherein:

said head mounts a resiliently deformable gasket for sealing between the tube sheet and said head to prevent leakage of fluid therebetween said head and the tube sheet.

9. A method for unloading non-packed, non-bridging and packed bridging flowable particle catalyst from an open end of a reactor tube secured by a tubesheet adjacent the open end of the tube, comprising the steps of:

placing a head adjacent the open end of a catalyst filled reactor tube to be unloaded;

forming a pressure differential in the tube for effecting flow of catalyst outwardly therefrom, including:

establishing a reference pressure adjacent the head for removing non-packed, non-bridging catalyst; and, discharging a fluid controlled stream of fluid within the tube to be unloaded to loosen bridging catalyst for effecting flow of loosened, bridging catalyst and fluid toward the head for moving the fluid and loosened, bridging catalyst from the tube to be unloaded, and;

flowing the catalyst outwardly from the open end of the tube with the pressure differential to the head.

10. The method of claim 9, wherein said step of discharging includes the steps of:

moving a lance through each of the reactor tubes to be unloaded; and, discharging the controlled stream of fluid from the lance adjacent the packed, bridging catalyst to loosen the same.

11. The structure as set forth in claim 1, wherein:
said means for effecting a pressure differential is a high volume, negative pressure means; and, said means for discharging a controlled stream of fluid includes means for providing low volume, high positive pressure fluid capable of being influenced by said high volume, negative pressure means of said pressure differential means.

* * * * *